May 14, 1968 J. LÜSCHER 3,383,570

TRANSISTOR-CAPACITOR INTEGRATED CIRCUIT STRUCTURE

Filed April 7, 1966 6 Sheets-Sheet 1

United States Patent Office 3,383,570
Patented May 14, 1968

3,383,570

TRANSISTOR-CAPACITOR INTEGRATED CIRCUIT STRUCTURE

Jakob Lüscher, Carouge, Geneva, Switzerland, assignor to Societe Suisse Pour l'Industrie Horlogere S.A., Geneva, Switzerland, a Swiss body corporate Continuation-in-part of application Ser. No. 441,975, Mar. 23, 1965. This application Apr. 7, 1966, Ser. No. 540,999
Claims priority, application Switzerland, Apr. 9, 1965, 5,031/65
9 Claims. (Cl. 317—235)

ABSTRACT OF THE DISCLOSURE

The invention provides an electronic circuit which can both be readily integrated and be of very low power consumption and in which circuit the active components consist essentially of insulated-gate field-effect transistors of same conductivity type and the passive components consist essentially of capacitors, the integrated circuit being featured by at least one elementary voltage-amplifying circuit having therein a pair of said transistors and a said capacitor, and supplied by a periodic voltage source.

This application is a continuation-in-part of my application Ser. No. 441,975, filed Mar. 23, 1965.

The present invention relates to a low power consumption integrated electronic circuit.

According to the present invention there is provided an integrated electronic circuit consisting essentially of insulated-gate field-effect transistors of the same conductivity type and of capacitor structure electrically connected in a predetermined circuit arrangement, each of said transistors having first and second electrodes in a conduction path, and a gate electrode for controlling the conductivity of the path, said electrodes being formed on one face of a body of semiconductive material and said first and second electrodes of the transistors having rectifying junctions with said body, and said capacitor structure including a capacitor having first and second electrodes and a dielectric between said first and second electrodes thereof, said capacitor electrodes and dielectric also being formed on said one face of said body, there being a voltage-amplifying elementary circuit having therein a pair of said transistors and said capacitor, the first electrodes of said pair of transistors and of said capacitor being connected to one another, the second electrodes of one of said pair of transistors and of said capacitor being adapted to be connected to the terminals of a periodic supply voltage source, the gate electrode and the second electrode of said one transistor providing the input of said voltage-amplifying elementary circuit and being adapted to be connected to the terminals of a control voltage source, the gate electrode of the other of said pair of transistors being connected to the second electrode of said capacitor, and the second electrodes of said pair of transistors being in the output of said voltage-amplifying elementary circuit.

The circuit according to the present invention is an improvement in the circuits disclosed in my application Ser. No. 441,975 insofar as the voltage-amplifying elementary circuit is able rapidly to charge, when necessary, in the absence of a control (input) voltage to the gate of its first transistor, a capacitor of low capacitance to a voltage having a value very close to the maximum value of the voltage appearing at the output of the elementary circuit, and for this capacitor to remain charged until the appearance of a control voltage of sufficient value.

*Identification of drawings*

Figure 8:
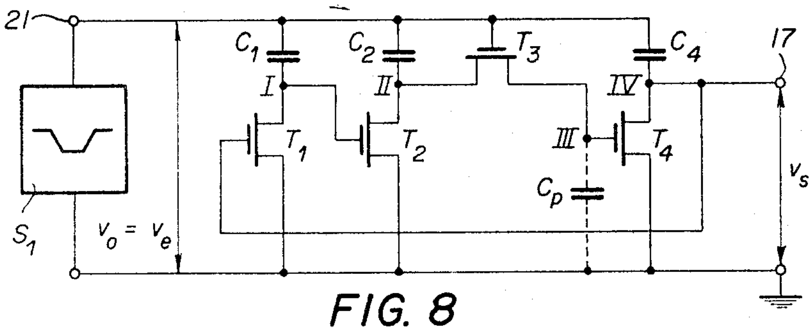
FIGURES 8, 10 and 12 is an electrical diagram of three different frequency dividing circuits, each including one elementary circuit according to FIGURE 1.
Figure 9A:
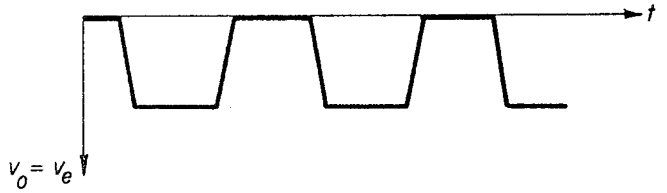
Figure 9B:
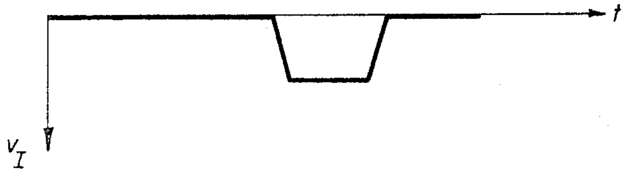
Figure 9C:
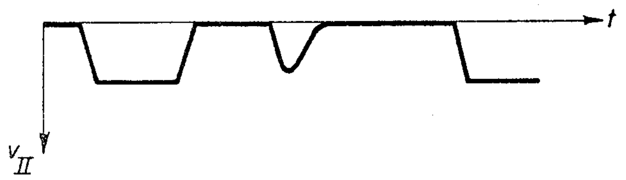
Figure 9D:
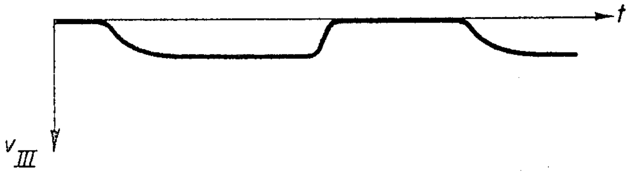
Figure 9E:
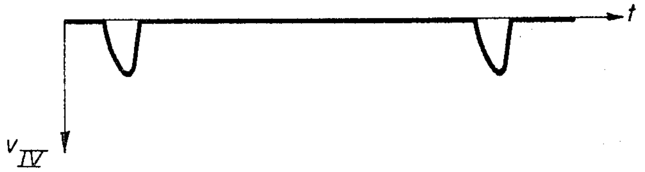
Figures 10, 11A, 11B, 11C, 11D, 11E, 11F:
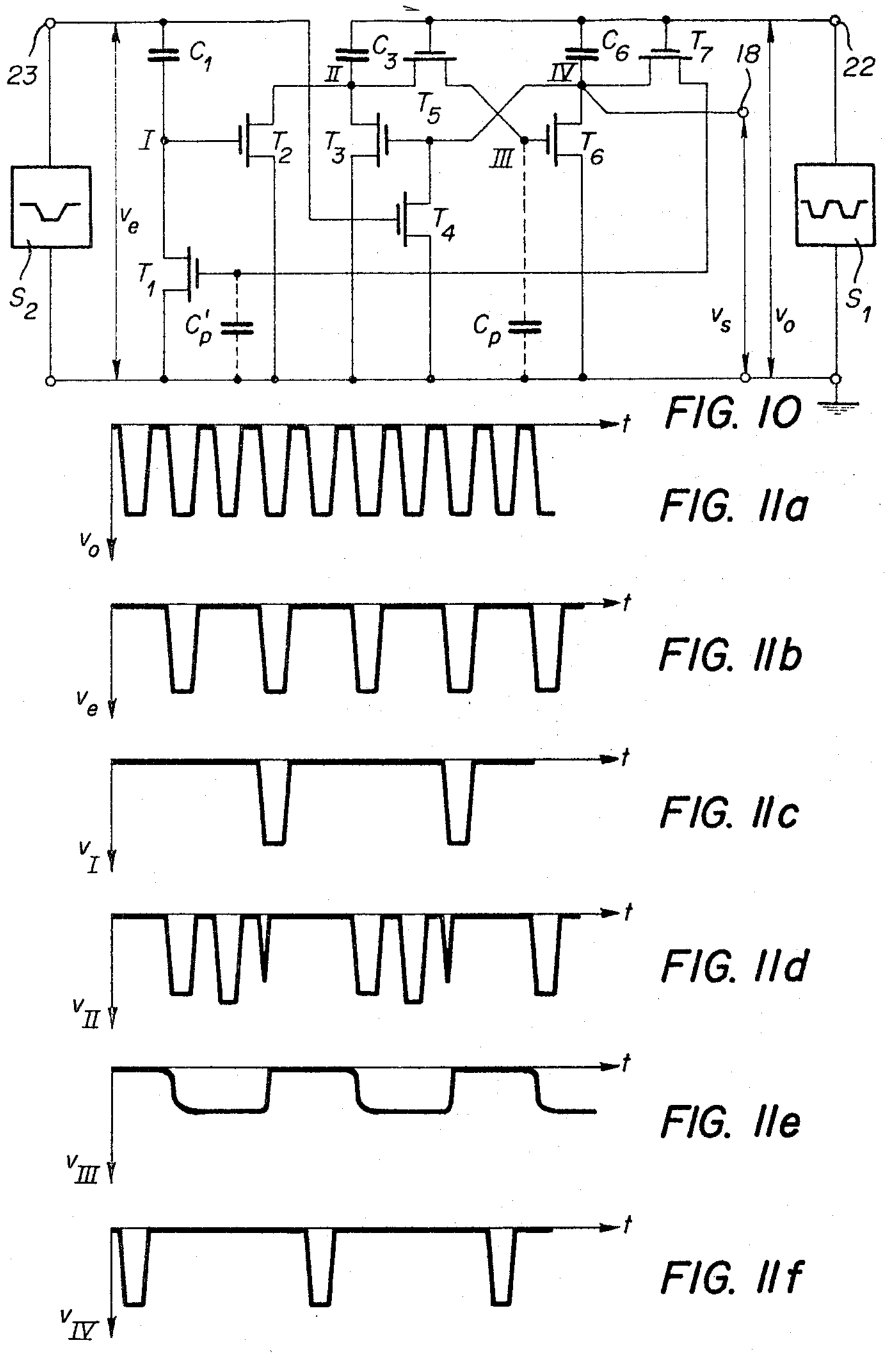
Figure 12:
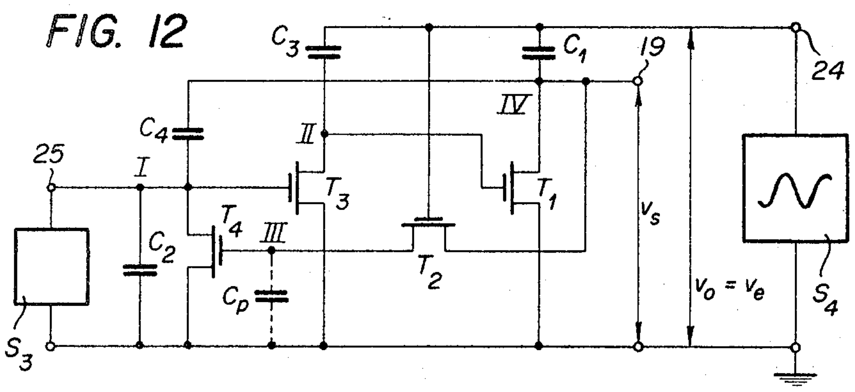
Figures 14, 15A, 15B, 15C, 15D, 15E, 15F:
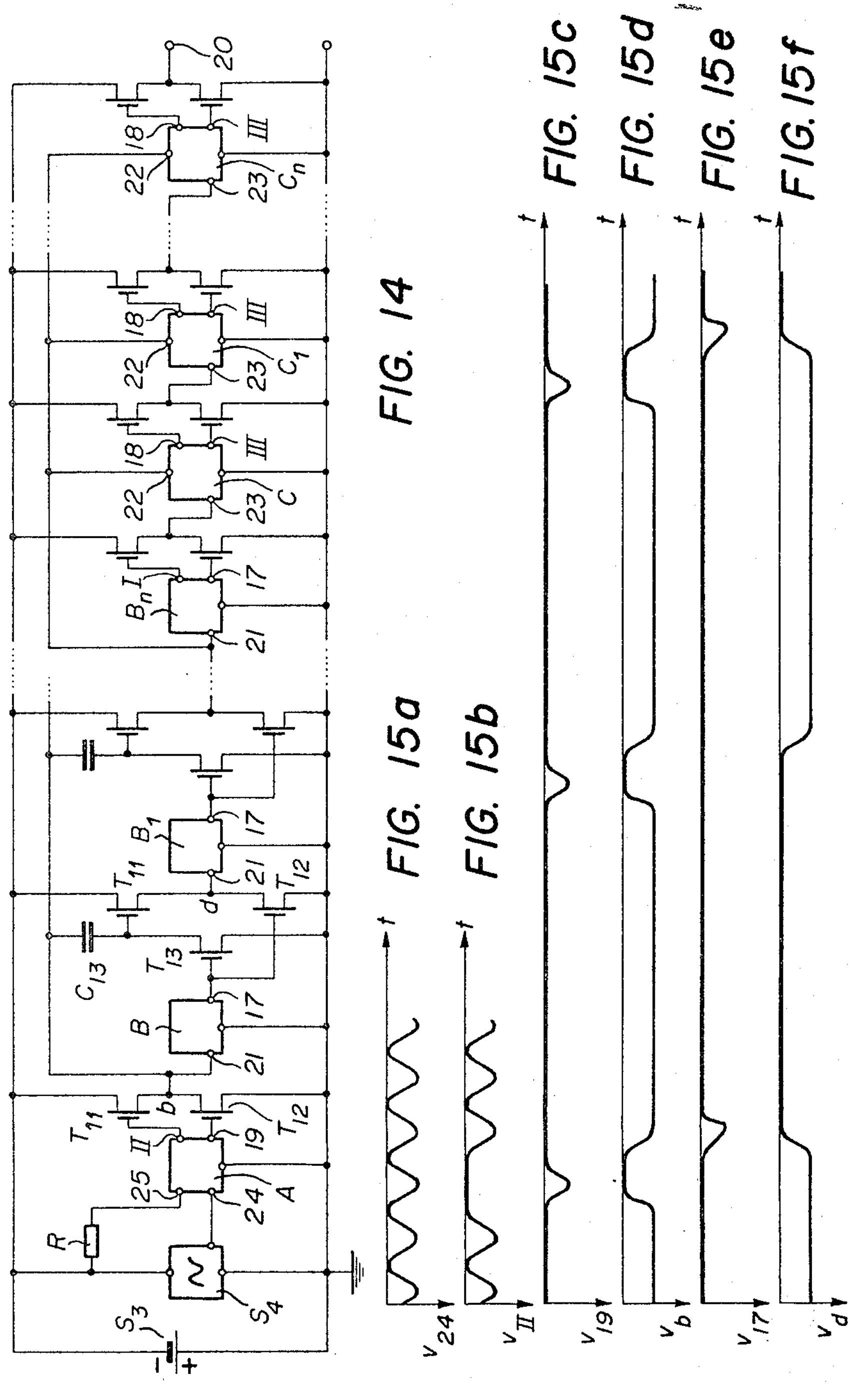

FIGURES 9*a* to 9*e*, 11*a* to 11*f*, and 13*a* to 13*e* show sixteen explanatory graphs in connection with FIGURES 8, 10 and 12;

FIGURE 14 is an electrical diagram of a multi-stage frequency divider; and

FIGURES 15*a* to 15*e* show six explanatory graphs in connection with the FIGURE 14 circuit.

*Disclosure of embodiments*

Figure 1:
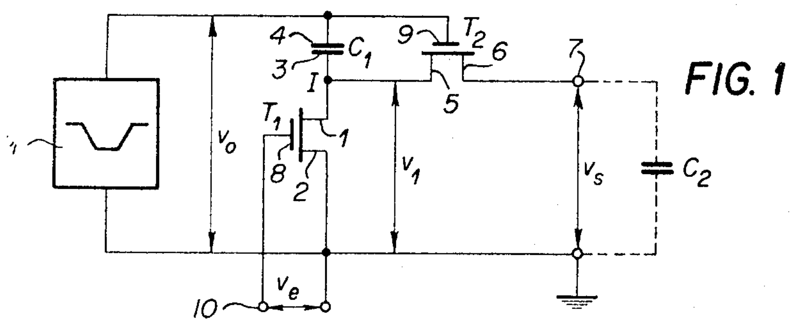
FIGURE 1 shows the electrical arrangement of a voltage-amplifying elementary circuit which according to the present invention is integrated.

The voltage-amplifying elementary circuit shown in FIGURE 1 comprises a first insulated-gate field-effect transistor $T_1$ which is connected, in series with a capacitor $C_1$, to a source $S_1$ supplying a driving periodic voltage $v_o$. Point I, which couples an electrode 1 of transistor $T_1$ and an electrode 3 of capacitor $C_1$, is connected to an electrode 5 of a second transistor $T_2$ whose other electrode 6 is connected to the output 7. The gate electrode 8 of transistor $T_1$ is connected to an input 10, whereas the gate electrode 9 of transistor $T_2$ is connected to source $S_1$. The second electrode 2 of transistor $T_1$ is earthed.

Figure 2:
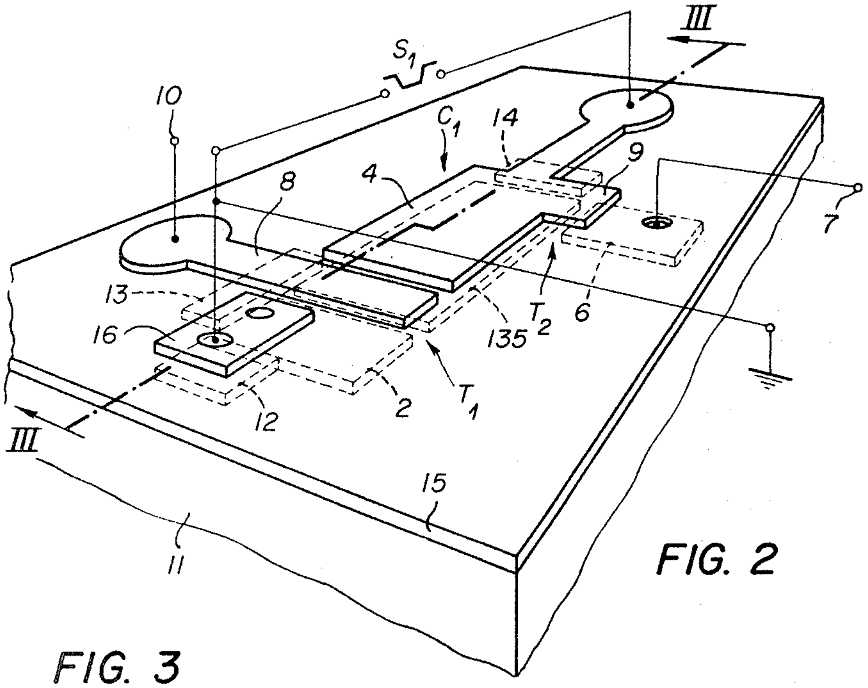
FIGURE 2 shows, in perspective, the circuit of FIGURE 1 in integrated form.
Figure 3:
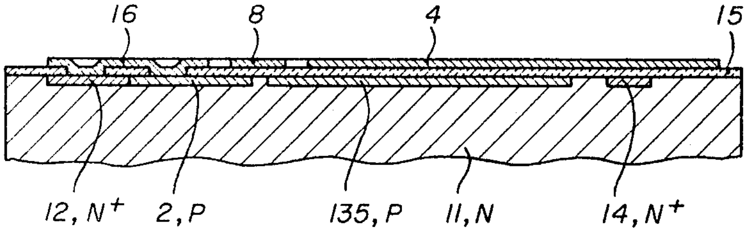
FIGURE 3 is a section along line III—III of FIGURE 2.

FIGURE 2 shows the above-described elementary circuit in integrated form. It is formed on one face of a semiconductive monocrystal which, in the present instance, is a monocrystal 11 of N-type silicon. The electrodes of transistors $T_1$ and $T_2$ and one electrode of capacitor $C_1$ are formed by P-type zones diffused into the crystal 11. The electrode 1 of transistor $T_1$, the electrode 5 of transistor $T_2$ and the electrode 3 of capacitor $C_1$ are formed by a common zone 135. The second electrode 2 of transistor $T_1$ is formed by zone 2, with the second electrode 6 of transistor $T_2$ being formed by zone 6. Three other zones 12, 13 and 14 are moreover formed in the same face of monocrystal 11 but are of $N^+$-type. The function of zone 12 is to enable the earthing of crystal 11 and the function of zones 13 and 14 being to prevent the build-up of inversion zones beneath the transistor gate connections. On the silicon oxide insulating layer 15 are deposited metallic layers which provide the gates 8 and 9 of transistors $T_1$ and $T_2$ and the second electrode 4 of capacitor $C_1$. Another layer 16 provides the ohmic contact for zones 2 and 12 to earth the electrode 2 of transistor $T_1$ and the monocrystal 11.

The above-described elementary circuit operates as follows:

In order that this operation may more readily be understood, consideration will first be given to the part made up of transistor $T_1$ and of capacitor $C_1$, i.e. without transistor $T_2$, to see what voltage $v_1$ would be in relation to the input (control) voltage $v_c$.

Figure 4:
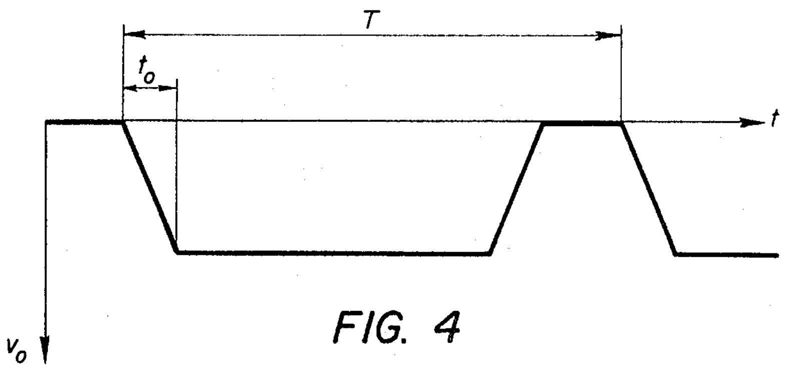
FIGURES 4 and 5 are two explanatory graphs in connection with the elementary circuit of FIGURE 1.
Figure 5:
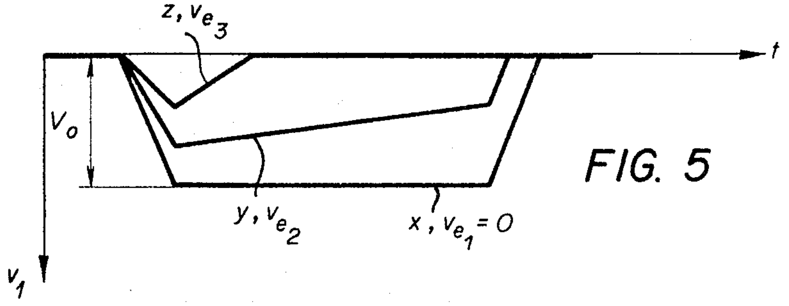

It will be assumed that source $S_1$ delivers unidirectional trapezoidal voltage impulses, as shown in FIGURE 4, and that the threshold voltage of transistor $T_1$ is larger than that of the PN junction formed by zone 135 with monocrystal 11. If the control (input) voltage $V_e$ is zero, the output voltage $V_1$ then practically varies between 0 and $V_o$, because of the effect of this junction PN, and corresponds, as regards shape, to voltage $v_o$ (see curve X in FIGURE 5). If voltage $v_e$ is now applied and is progressively increased, voltage $v_1$ will progressively decrease and its shape will progressively change as shown by curves Y and Z in FIGURE 5. In view of this change in the shape of voltage $V_1$, various circuit amplification factors can be defined depending on whether it is the peak value, the mean value or the effective value of voltage $v_1$ that is being referred to.

In the following, reference will be had to the peak value which is the most important for the operation of electronic circuits comprising one or more elementary circuits.

Under current saturation conditions for transistor $T_1$, this peak value is $$V_{1p}=A\cdot t_o-\frac{I_s}{C_1}\cdot t_o$$

wherein $$A=\frac{dv_o}{dt}=\frac{V_o}{t_o}$$

and $$I_s=K'(V_e-V_{eo})^2$$

$V_{eo}$ being the threshold voltage of transistor $T_1$ and K' being a constant which depends on the geometry of transistor $T_1$.

To obtain $V_{1p}=0$, it is necessary to have $$I_s=AC_1$$

such being the case when the control voltage $v_e$ will at least be $$v_e=\sqrt{\frac{AC_1}{K'}}$$

By carefully choosing values A, $C_1$ and K', it is possible to arrange for this value of $v_e$ to be much smaller than that of voltage $v_o$.

The circuit will now be considered as a whole, i.e. including transistor $T_2$. Moreover, it will be assumed that a capacitor $C_2$, shown in dotted lines and having a capacitance much smaller than that of capacitor $C_1$, is connected to the output 7 of the circuit.

If it is supposed that voltage $v_e$ is zero and that the capacitor $C_2$ is discharged, a voltage $v_o$ impulse will then as a result give rise to a voltage $v_1$ having practically the same value as $v_o$ and will moreover give rise to a control voltage for transistor $T_2$, across its gate 9 and its electrode 6 which forms its source. This transistor $T_2$ will thus be rendered conductive, thereby causing capacitor $C_2$ to be charged by the output voltage $v_s$ whose maximum value will amount to the difference between $V_o$ and $V_{eo}$ (the threshold voltage of transistor $T_2$). When this maximum value of $V_s$ will have been reached, transistor $T_2$ will be blocked as its control voltage will then be equal to its threshold voltage. A reduction of voltage $v_o$ will cause this control voltage of transistor $T_2$ to decrease still further so that transistor $T_2$ will remain blocked and no discharge of capacitor $C_2$ will, as a result, be able to occur.

If now an input voltage $v_e$ having a value greater than $$\sqrt{\frac{AC_1}{K'}}$$

is applied, transistor $T_1$ will become conductive, so that the next $v_o$ impulse will cause the control voltage of transistor $T_2$ to appear, but this time across its control electrode 9 and the electrode 5 which will now act as its source. Transistor $T_2$ will thus be rendered conductive and this will bring about the discharge of capacitor $C_2$ via the two transistors $T_2$ and $T_1$.

As will be appreciated, the above-described elementary circuit may be used as an A.C. to D.C. controlled converter when source $S_1$ is an alternating voltage or bidirectional impulse source.

Figure 6:
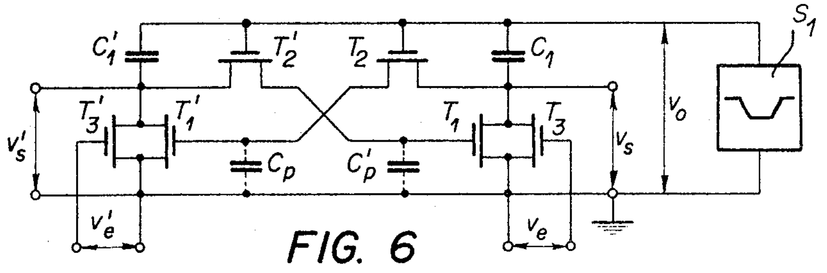
FIGURE 6 is an electrical diagram of a first bistable set-reset circuit, which circuit includes two elementary circuits according to FIGURE 1.

The bistable set-reset circuit of FIGURES 6 consists of two voltage-amplifying elementary circuits similar to that shown in FIGURE 1, namely $T_1$, $C_1$, $T_2$ and $T_1'$, $C_1'$, $T_2'$. These circuits are supplied by the same source $S_1$ and are so connected that the input and the output of one circuit may be respectively connected to the output and to the input of the other circuit. Further, each of the two circuits comprises a third transistor, respectively $T_3$ and $T_3'$, connected in parallel to the first transistor, respectively $T_1$ and $T_1'$, the gate of this third transistor being intended for connection to a control voltage, respectively $v_e$ and $v_e'$. The capacitors $C_p$ and $C_p'$ are essentially formed by the input capacitance of transistors $T_1'$ and $T_1$ respectively.

The operation of this set-reset circuit will readily be understood from the explanations given above in connection with the operation of the elementary circuit of FIGURE 1. Depending on whether it is control voltage $v_e$ or $v_e'$ that is being applied, the circuit is placed in one or other of its stable states.

Figure 7:
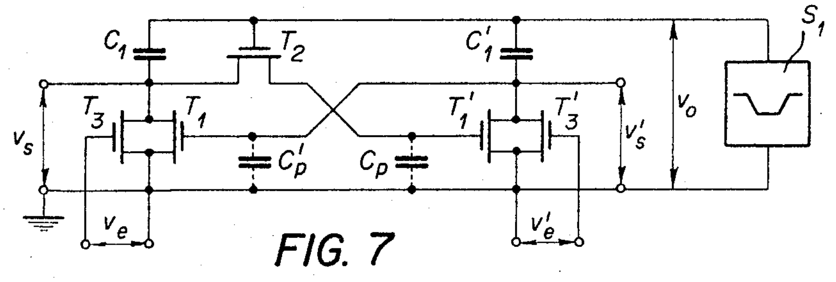
FIGURE 7 is an electrical diagram of a second bistable set-reset circuit, which circuit includes one elementary circuit according to FIGURE 1.

The bistable set-reset circuit of FIGURE 7 differs from that shown in FIGURE 6 in that one of the elementary circuits is of the kind disclosed in our above mentioned patent application Ser. No. 441,975, filed Mar. 23, 1965, i.e. one consisting of a transistor $T'_1$ and of a capacitor $C'_1$, the other elementary circuit, i.e. $T_1$, $C_1$, $T_2$ being as before similar to that shown in FIGURE 1 herein. As in the previous case, each of these two circuits comprises a further transistor in parallel with the input transistor, respectively $T_3$ and $T_3'$.

The circuit operates in a manner similar to the FIGURE 6 circuit except that there is a preferential stable state, i.e. a stable state to which it will always pass, under the action of $v_o$, when both capacitors $C_p$ and $C_p'$ are discharged. It may be used with advantage as a memory in a frequency dividing circuit, as will be explained later.

The frequency dividing stage shown in FIGURE 8 comprises a voltage amplifying circuit $T_2$, $C_2$, $T_3$, similar to that of FIGURE 1, and two elementary circuits each consisting of a transistor and of a capacitor, respectively $T_1$, $C_1$ and $T_4$, $C_4$.

The input and the output of circuit $T_2$, $C_2$, $T_3$ are respectively connected to the output of circuit $T_1$, $C_1$ and to the input of circuit $T_4$, $C_4$ with the output of the latter being connected to the input of circuit $T_1$, $C_1$. The three circuits are supplied by source $S_1$ which delivers a periodic voltage $v_o$ in the form of trapezoidal impulses. This voltage also constitutes the input voltage $v_e$ whose frequency is to be divided. This frequency dividing stage operates as follows:

It will be assumed that capacitor $C_p$, formed by the input capacitance of transistor $T_4$, is charged so as to be current conductive, whereas transistor $T_1$ is blocked.

A voltage $v_o$ impulse delivered by source $S_1$ will cause this voltage $v_o$ to appear at point I, and this in turn will cause transistor $T_2$ to become conductive and cause the discharge of capacitor $C_{pn}$ via transistors $T_2$ and $T_3$. The mutual conductance of transistor $T_2$ being slight in relation to that of transistor $T_4$, the time taken for the discharge of capacitor $C_p$ will be longer than $t_o$ (see FIGURE 4) so that no voltage will appear at point IV, and hence no voltage $v_s$ will appear at the output 17 of the dividing stage, before the next voltage $v_o$ impulse. The latter will thus cause the transistor $T_1$ to become conductive, the transistor $T_2$ to be blocked, the voltage to appear at point II and the capacitor $C_p$ to be recharged. The mutual conductance of transistor $T_3$ being less than that of transistor $T_4$, the recharging of capacitor $C_p$ will take longer than $t_o$ (FIGURE 4), thereby enabling a voltage $v_s$ impulse to appear at output 17.

Consequently, as will be apparent from the above, there will only be one voltage $v_s$ impulse at the output 17 of the dividing stage for every two voltage $v_o$ impulses at the input 21. The frequency of the latter voltage is thus halved.

FIGURES 9*a* to 9*e* show, respectively, voltages $v_o$, $v_I$, $v_{II}$, $v_{III}$ and $v_{IV}$.

In this dividing stage, the input (control) voltage $v_e$, whose frequency is to be divided, and the supply voltage $v_o$ are identical. Although the capacitor $C_2$, forming the memory of the dividing stage, is not likely to be prematurely discharged by reverse junction currents when the frequency is medium or high, the same does not hold true when the frequency is very low. In this latter case it is necessary to provide a supply current having a frequency greater than that of the control voltage so that the capacitor $C_p$ may be recharged by the supply voltage during one period of the control voltage.

The dividing stage of FIGURE 10 is for very low frequencies. As will be observed, this dividing stage comprises a bistable circuit which is similar to that shown in FIGURE 7 and which consists of two elementary circuits, the first, which is similar to that of FIGURE 1, comprising two transistors $T_3$, $T_5$ and a capacitor $C_3$, and the second comprising a transistor $T_6$ and a capacitor $C_6$. The two circuits are supplied with a common voltage $v_o$ provided by a source $S_1$. The output of the first circuit $T_3$, $C_3$, $T_5$ is, on the one hand, connected to the input of the second circuit $T_6$, $C_6$, and is, on the other hand, earthed via a transistor $T_2$. The gate of this transistor $T_2$ is connected to the output of a third elementary circuit which comprises a transistor $T_1$ and a capacitor $C_1$ and which is supplied by a source $S_2$ providing the input (control) voltage $v_e$. The gate of transistor $T_1$ is connected to the output of the second elementary circuit $T_6$, $C_6$ via a transistor $T_7$ whose gate is connected to source $S_1$. The output of this second circuit $T_6$, $C_6$ moreover is, on the one hand, connected to the input of the second circuit $T_3$, $C_3$, $T_5$ and is, on the other hand, earthed via a transistor $T_4$ whose gate is connected to source $S_2$. In the case under consideration, the frequency of voltage $v_o$ is twice that of voltage $v_e$.

This dividing stage operates as follows:

It will be assumed that capacitor $C_p$ is discharged, so that transistor $T_6$ is blocked. A voltage $v_o$ impulse from source $S_1$ will cause a faster increase of the control voltage of transistor $T_3$ than that of transistor $T_6$. Transistor $T_3$ being then rendered conductive, capacitor $C_p$ will therefore remain discharged and transistor $T_6$ blocked so that voltage $v_o$ will appear at point IV and consequently voltage $v_s$ will appear at the output 18 of the dividing stage. This will also result in capacitor $C'_p$ being charged via transistor $T_7$ and hence in transistor $T_1$ in becoming conductive. At the next voltage $v_o$ impulse, which is delivered simultaneously with a voltage $v_e$ impulse, no voltage will appear at point I since transistor $T_1$ is conductive. On the other hand, however, transistor $T_4$ will become conductive thereby causing transistor $T_3$ to be blocked. With transistor $T_2$ also blocked, voltage $v_o$ will therefore appear at point II, thereby causing capacitor $C_p$ to be charged via transistor $T_5$, transistor $T_6$ to become conductive, capacitor $C'_p$ to be discharged via transistors $T_7$ and $T_4$, and transistor $T_1$ to be blocked. The dividing stage will remain in this state despite leakage currents since capacitor $C_p$ is recharged by the next impulse voltage $v_o$. At the next impulse of voltage $v_e$, the latter will appear at point I since transistor $T_1$ is blocked. This will cause transistor $T_2$ and $T_4$ to become conductive, so that no voltage will appear at points II and IV and hence at the output 18 of the dividing stage. At the next impulse of $v_o$ alone, the dividing stage will be returned to its starting state. Consequently, as will be apparent from the above, for every two impulses of voltage $v_e$ at the input 23 there will only be one impulse of voltage $v_s$ at the output 18 of the dividing stage circuit.

FIGURES 11*a* to 11*f* respectively show the voltages $v_o$, $v_e$, $v_I$, $v_{II}$, $v_{III}$ and $v_{IV}$.

The two above-described dividing stages, illustrated in FIGURES 8 and 10 respectively, each have a dividing factor of two. It is often of advantage, when having to divide very high frequencies, to have dividing stages available having a larger dividing factor.

FIGURE 12 shows a frequency dividing stage with which a higher dividing factor can be obtained. This stage consists of an elementary circuit $T_1$, $C_1$, $T_2$, similar to that of FIGURE 1, and of an elementary circuit $T_3$, $C_3$. The output of the first circuit $T_1$, $C_1$, $T_2$ is connected both to the input of a transistor $T_4$, which grounds the input of the second circuit $T_3$, $C_2$, and to the input of this second circuit via a capacitor $C_4$. The output of the second circuit $T_3$, $C_3$ is connected to the input of the first circuit $T_1$, $C_1$, $T_2$. A capacitor $C_2$, connected in parallel to the input of the second circuit $T_3$, $C_3$, is connected to a current source $S_3$, which may, for example, be formed by a cell which is series-connected with a resistor having a high ohmic resistance. The two elementary circuits are supplied by a source $S_4$ of sinusoidal voltage.

The above-described dividing stage operates as follows:

Let us start from the moment capacitor $C_2$ is discharged. Transistor $T_3$ being blocked, voltage $v_o$ from source $S_4$ appears at point II, thereby rendering transistor $T_1$ conductive. No voltage therefore appears at point IV and hence at output 19 of the dividing stage. The capacitor $C_2$ is now becoming charged by source $S_3$. As soon as the voltage of capacitor $C_2$ reaches a value greater than the threshold voltage of $T_3$, the voltage at point II will be sufficiently reduced by the current of transistor $T_3$. This will cause the voltage to appear at point IV and hence an increase of the voltage at point I, via capacitor $C_4$, thereby helping to charge capacitor $C_2$ to a higher voltage. This will cause transistor $T_3$ to become fully conductive and transistor $T_1$ to be blocked. The voltage $v_o$ which will appear at point II will charge capacitor $C_p$ via transistor $T_2$, and this will cause, with a certain time lag, transistor $T_4$ to become conductive and capacitor $C_2$ to be discharged, i.e. cause the dividing stage to be returned to the state at which the explanation of its operation was started.

Figure 13A:
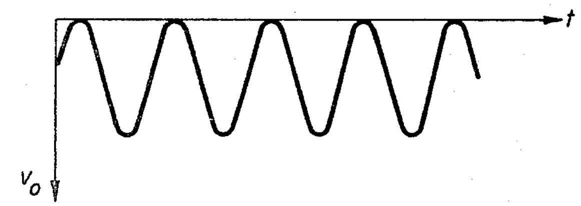
Figure 13B:
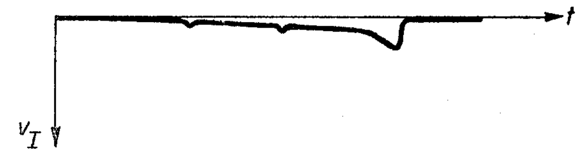
Figure 13C:
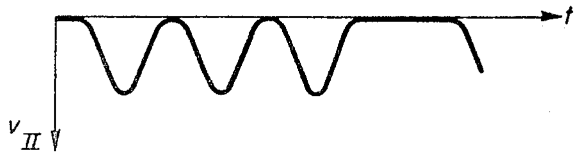
Figure 13D:
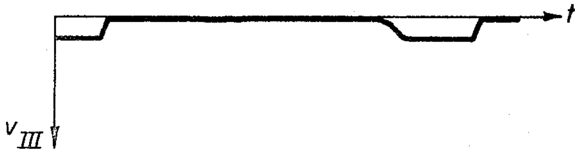
Figure 13E:
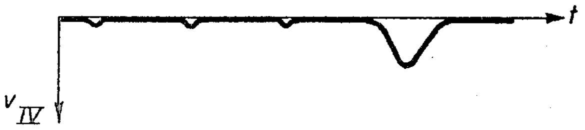

FIGURES 13*a* and 13*e* respectively show the voltages $v_o$, $v_I$, $v_{II}$, $v_{III}$ and $v_{IV}$ for the case in which the dividing factor is 4.

The frequency dividing circuit shown in FIGURE 14 comprises a certain number of stages of three different types, i.e. those described with reference to FIGURES 8, 10 and 12. This circuit is intended to reduce a high frequency to a very low frequency. The number of stages will obviously depend on the ratio between these two frequencies.

The first stage A of the divider is of the kind illustrated in FIGURE 12. It is connected to a source $S_3$ of direct voltage via a resistor R and to a source $S_4$ of sinusoidal voltage whose frequency is to be divided. This first stage A is connected to the next stage B, which is of the kind shown in FIGURE 8, via a decoupling circuit which is supplied by source $S_3$ and which comprises two series-mounted transistors $T_{11}$ and $TT_{12}$ that are respectively controlled by the voltage of output 19 and by that of point II of stage A (see FIGURE 12), i.e. by phase-shifted impulses. The connecting point of transistors $T_{11}$ and $T_{12}$ is connected to the input of stage B. The output 17 of the latter is connected to the following stage $B_1$, which is of the same kind, via a decoupling circuit which comprises transistors $T_{11}$ and $T_{12}$ preceded by a voltage-amplifying elementary circuit consisting of a transistor $T_{13}$ and of a capacitor $C_{13}$. These two circuits thus together form a variant of the decoupling circuit which, in fact, is a voltage and power amplifying circuit similar to that disclosed in the above-mentioned patent specification. Stage $B_1$ is followed by a certain number of stages of the same kind, connected to one another by this second decoupling circuit, and the output of the last of these stages, $B_n$, is connected via a decoupling circuit $T_{11}$, $T_{12}$ to the input of a stage C of the type illustrated in FIGURE 10. This latter stage is followed by a number of stages of the same kind and the output of the last of these stages, $C_n$, is connected by the decoupling circuit to the output 20 of the divider.

Considering the above explanation about the operation of the FIGURE 1 voltage-amplifying elementary circuit and about the three types of dividing stage comprising such a circuit, the operation of the above-described divider formed thereby will readily be understood. It should, however, still be pointed out that the decoupling circuit formed by transistors $T_{11}$ and $T_{12}$, besides decoupling the input capacitance of one stage from the output of the preceding stage, also acts as a periodic supply voltage source by converting into such voltage a direct voltage supplied thereto.

It should further be pointed out that the elementary circuits $T_{13}$, $C_{13}$ comprised by the decoupling circuits of stages B, can be supplied directly by source $S_4$.

Clearly, a multi-stage frequency divider could be made up of a single kind of stage, or of two kinds or also of three, as in the case with the divider described by way of example.

FIGURES *15a* to *15f* respectively show the voltages $v_{24}$, $v_{II}$, $v_{19}$, $v_b$, $v_{17}$ and $v_d$.

The described divider only consumes energy for very short periods of time during which the very low capacitance capacitors of these various stages are charged. Thus, if the divider stages B all have the same dimensions, the mean power consumption of each of these stages decreases linearly with the frequency of its supply voltage. The mean power consumption of the divider is thus extremely small.

In view of the ease with which a multi-stage dividing circuit, such as that just described, can be integrated and of its very low energy consumption, it can be utilized with advantage in electronic devices requiring such features, for instance electronic wrist watches.

Although electronic clocks, in particular clocks comprising a quartz oscillator as a regulator (timing means), and further comprising an electronic circuit for dividing the frequency of this oscillator to a suitable value to control a time indicating device, have been known for a long time, no small electronic watch has, as is known, yet been produced. This is due to the difficulties involved in economically producing a dividing circuit of very low energy consumption, which difficulties have been overcome by the present invention.

Another advantage provided by the above-described divider, due in particular to the type A stage (FIGURE 12), destines it even more for use in a small electronic watch. As will have been gathered from the operation of this stage, the capacitor $C_2$ is charged and discharged in accordance with the periodicity of the sinusoidal voltage while capacitor $C_1$ is being charged. When transistor $T_3$ becomes conductive, capacitor $C_3$ is charged and discharged during one period of voltage $v_0$ whereas capacitor $C_1$ receives practically no charge at all.

If capacitors $C_1$ and $C_3$ both have the same capacitance value, the capacitive load for source $S_4$ thus remains practically constant. This fact is very important when the periodic voltage source is a high frequency oscillator, such as, for instance, a quartz oscillator.

The load capacity, which is represented by either of capacitors $C_1$ and $C_3$, may be included in a circuit tuned to the inherent frequency of the quartz, thereby making it possible to recover the potential energy of the charge in these capacitors.

An electronic watch comprising an electronic circuit in accordance with the present invention, would thus include for source $S_3$ a small electric cell, and for source $S_4$ a quartz oscillator supplying a sinusoidal voltage having, for example, a frequency of about $10^6$ c./s. The divider shown in FIGURE 14 would then be adapted in a manner such that the voltage at its output 20 may have a frequency of about 1 c./s., so as to be able to control a time indicating device.

I claim:

1. An integrated electronic circuit consisting essentially of insulated-gate field-effect transistors of the same conductivity type and of capacitor structure electrically connected in a predetermined circuit arrangement, each of said transistors having first and second electrodes in a conduction path, and a gate electrode for controlling the conductivity of the path, said electrodes being formed one one face of a body of semiconductive material and said first and second electrodes of the transistors having rectifying junctions with said body, and said capacitor structure including a capacitor having first and second electrodes and a dielectric between said first and second electrodes thereof, said capacitor electrodes and dielectric also being formed on said one face of said body, there being a voltage-amplifying elementary circuit having therein a pair of said transistors and said capacitor, the first electrodes of said pair of transistors and of said capacitor being connected to one another, the second electrodes of one of said pair of transistors and of said capacitor being adapted to be connected to the terminals of a periodic supply voltage source, the gate electrode and the second electrode of said one transistor providing the input of said voltage-amplifying elementary circuit and being adapted to be connected to the terminals of a control voltage source, the gate electrode of the other of said pair of transistors being connected to the second electrode of said capacitor, and the second electrode of said pair of transistors being in the output of said voltage-amplifying elementary circuit.

2. An integrated electronic circuit according to claim 1, wherein the source of periodic supply voltage is a source of unidirectional trapezoidal impulses.

3. An integrated electronic circuit according to claim 1 characterized by being a bistable set-reset circuit, having first and second inputs and first and second outputs, and comprising a first said voltage-amplifying elementary circuit formed by first and second said transistors and a first said capacitor, the first electrodes of said first and second transistors and of said first capacitor being connected to one another, the second electrodes of said first transistor and of said first capacitor being adapted to be connected to the terminals of a periodic supply voltage source, the gate electrode and the second electrode of said first transistor providing said first input of said bistable set-reset circuit and being adapted to be connected to the terminals of a control voltage source, the gate electrode of said second transistor being connected to the second electrode of said first capacitor, and the first and second electrodes of said first transistor providing said first output of said bistable set-reset circuit; a second said voltage-amplifying elementary circuit formed by third and fourth said transistors and by a second said capacitor, the first electrodes of said third and fourth transistors and of said second capacitor being connected to one another, the second electrodes of said third transistor and of said second capacitor being adapted to be connected to the terminals of said periodic supply voltage source, the gate electrode and the second electrode of said third transistor providing said second input of said bistable set-reset circuit and being adapted to be connected to the terminals of a control voltage source, the gate electrode of said fourth transistor being connected to the second electrode of said second capacitor, and the first and second electrodes of said third transistor providing said second output of said bistable set-reset circuit; a fifth said transistor connected in parallel with said third transistor, the gate electrode of said fifth transistor being connected to the second electrode of said second transistor; and a sixth said transistor connected in parallel with said first transistor, the gate electrode of said sixth transistor being connected to the second electrode of said fourth transistor.

4. An integrated electronic circuit according to claim 1 characterized by being a bistable set-reset circuit, having first and second inputs and first and second outputs, and comprising one said voltage-amplifying elementary circuit formed by first and second said transistors and a first said capacitor, the first electrodes of said first and second transistors and of said first capacitor being connected to one another, the second electrodes of said first transistor and of said first capacitor being adapted to be connected to the terminals of a periodic supply voltage source, the gate electrode and the second electrode of said first transistor providing said first input of said bistable set-reset circuit and being adapted to be connected to the terminals of a control voltage source, the gate electrode of said second transistor being connected to the second electrode of said first capacitor, and the first and second electrodes of said first transistor providing said first output of said bistable set-reset circuit; a voltage-amplifying elementary circuit formed by a third said transistor and a second said capacitor, said third transistor and said second capacitor being connected in series by their first electrodes, their second electrodes being adapted to be connected to the terminals of said periodic supply voltage source, the gate electrode and the second electrode of said third transistor providing said second input of said bistable set-reset circuit and being adapted to be connected to the terminals of a control voltage source, and the first and second electrodes of said third transistor providing said second output of said bistable set-reset circuit; a fourth said transistor connected in parallel with said first transistor, the gate electrode of said fourth transistor being connected to the first electrode of said third transistor; and a fifth said transistor connected in parallel with said third transistor, the gate electrode of said fifth transistor being connected to the second electrode of said second transistor.

5. An integrated electronic circuit according to claim 1 characterized by being a frequency dividing circuit comprising, a plurality of stages each having an input and an output and each including at least one said voltage-amplifying elementary circuit, and further comprising decoupling means connecting the output of one stage with the input of the next stage, said plurality of stages including at least two of the following three types of stage: a low frequency dividing type of stage, a medium frequency dividing type of stage and a high frequency dividing type of stage.

6. An integrated electronic circuit according to claim 5, wherein the medium frequency dividing type of stage includes one said voltage-amplifying elementary circuit, said one voltage-amplifying elementary circuit having therein first and second said transistors and a first said capacitor, the first electrodes of said first and second transistors and of said first capacitor being connected to one another, the second electrodes of said first transistor and of said first capacitor being adapted to be connected to the terminals of a periodic voltage source; a voltage-amplifying elementary circuit having therein a third said transistor and a second said capacitor, said third transistor and said second capacitor being connected in series by their first electrodes, their second electrodes being adapted to be connected to the terminals of said periodic voltage source, and the first electrode of said third transistor being connected to the gate electrode of said first transistor; and a further voltage-amplifying elementary circuit having therein a fourth said transistor and a third said capacitor, said fourth transistor and said third capacitor being connected in series by their first electrodes, their second electrodes being adapted to be connected to the terminals of said periodic voltage source, the first electrode of said fourth transistor being connected to the gate electrode of said third transistor, and the first and second elecrodes of said fourth transistor providing said output of said medium frequency dividing type of stage.

7. An integrate electronic circuit according to claim 5, wherein each high frequency dividing type of stage includes one said voltage-amplifying elementary circuit, said one voltage-amplifying elementary circuit having therein first and second said transistors and a first said capacitor, the first electrodes of said first and second transistors and of said first capacitor being connected to one another, the second electrodes of said first transistor and of said first capacitor being adapted to be connected to the terminals of a periodic voltage source, the gate of said second transistor being connected to the second electrode of said first capacitor and the first and second electrodes of said first transistor providing the output of said high frequency dividing type of stage; a voltage-amplifying elementary circuit consisting of a third said transistor and a second said capacitor, said third transistor and said second capacitor being connected in series by their first electrodes, their second electrodes being adapted to be connected to the terminals of said periodic voltage source, and the first electrode of said third transistor being connected to the gate electrode of said first transistor; a fourth said transistor of which the first electrode is connected to the gate electrode of said third transistor and of which the gate electrode is connected to the second electrode of said second transistor; a third said capacitor connected in parallel with said fourth transistor and being adapted to be connected to the terminals of a direct voltage source; and a fourth said capacitor of which the first electrode is connected to the first electrode of said first transistor and of which the second electrode is connected to the connection between the gate electrode of said third transistor and the first electrode of said fourth transistor.

8. An integrated electronic circuit according to claim 5, wherein said decoupling means comprises a further pair of said transistors which are series-connected by their first electrodes, their second electrodes being adapted to be connected to a direct voltage supply source, their gate electrodes being connected to the output of said one stage and their first electrodes being connected to the input of said next stage.

9. An integrated electronic circuit according to claim 5, wherein said decoupling means comprises a further three said transistors and a further said capacitor, with the first of said further three transistors and said further capacitor being series-connected by their first electrodes, their second electrodes being adapted to be connected to a periodic voltage supply source, with the second and third of said further three transistors being connected in series by their first electrodes, their second electrodes being adapted to be connected to a direct voltage supply source, the gate electrodes of said first and second further transistors being connected to the output of said one stage, the gate of said third further transistor being connected to the first electrodes of said first further transistor and of said further capacitor, and the first electrodes of said second and third further transistors being connected to the input of said next stage.

References Cited

UNITED STATES PATENTS

| | | | |
|---|---|---|---|
| 3,137,796 | 6/1964 | Luscher | 307—88.5 |
| 3,233,123 | 2/1966 | Heiman | 307—88.5 |

JOHN W. HUCKERT, *Primary Examiner.*

R. F. SANDLER, *Assistant Examiner.*